US008843951B1

(12) United States Patent
Sherrets et al.

(10) Patent No.: US 8,843,951 B1
(45) Date of Patent: Sep. 23, 2014

(54) USER BEHAVIOR INDICATOR

(75) Inventors: Doug Sherrets, San Francisco, CA (US); Sean Liu, Sunnyvale, CA (US); Brett Rolston Lider, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/595,121

(22) Filed: Aug. 27, 2012

(51) Int. Cl.

| | |
|---|---|
| ***H04H 60/32*** | (2008.01) |
| ***H04H 60/43*** | (2008.01) |
| ***H04N 21/442*** | (2011.01) |
| *H04N 7/173* | (2011.01) |
| *H04H 60/33* | (2008.01) |

(52) U.S. Cl.
CPC ......... *H04N 21/44222* (2013.01); *H04H 60/43* (2013.01); *H04N 2007/1739* (2013.01); *H04H 60/33* (2013.01); *H04N 7/17309* (2013.01)
USPC ................................ 725/14; 725/38; 709/224

(58) Field of Classification Search
CPC .................... H04N 21/44222; H04N 7/17309; H04N 2007/1739; H04H 60/43; H04H 60/33
USPC ............................................................ 725/14
See application file for complete search history.

(56) References Cited

U.S. PATENT DOCUMENTS

| | | | | |
|---|---|---|---|---|
| 7,743,394 | B2 * | 6/2010 | Smith et al. | 725/19 |
| 7,853,969 | B2 * | 12/2010 | Smith et al. | 725/22 |
| 7,941,535 | B2 * | 5/2011 | Sherrets et al. | 709/225 |
| 8,087,041 | B2 * | 12/2011 | Fu et al. | 725/14 |
| 8,091,101 | B2 * | 1/2012 | Smith et al. | 725/19 |
| 8,132,200 | B1 * | 3/2012 | Karam | 725/24 |
| 8,271,338 | B2 * | 9/2012 | Hunt et al. | 705/26.8 |
| 8,380,801 | B2 * | 2/2013 | Sherrets et al. | 709/206 |
| 2003/0083951 | A1 * | 5/2003 | Connelly | 705/26 |
| 2006/0206478 | A1 * | 9/2006 | Glaser et al. | 707/5 |
| 2006/0212442 | A1 * | 9/2006 | Conrad et al. | 707/5 |
| 2006/0212444 | A1 * | 9/2006 | Handman et al. | 707/5 |
| 2007/0143778 | A1 * | 6/2007 | Covell et al. | 725/19 |
| 2008/0086742 | A1 * | 4/2008 | Aldrey et al. | 725/24 |
| 2009/0199251 | A1 * | 8/2009 | Badoiu et al. | 725/105 |
| 2009/0282144 | A1 * | 11/2009 | Sherrets et al. | 709/224 |
| 2010/0010877 | A1 * | 1/2010 | Hunt et al. | 705/10 |
| 2010/0088714 | A1 * | 4/2010 | Hawkins et al. | 725/14 |
| 2010/0146531 | A1 * | 6/2010 | Fu et al. | 725/14 |
| 2010/0169927 | A1 * | 7/2010 | Yamaoka et al. | 725/46 |
| 2011/0078718 | A1 * | 3/2011 | Jakobi et al. | 725/14 |
| 2011/0213769 | A1 * | 9/2011 | Handman et al. | 707/722 |
| 2012/0072935 | A1 * | 3/2012 | Smith et al. | 725/5 |
| 2012/0151513 | A1 * | 6/2012 | Zigmond et al. | 725/14 |
| 2012/0173865 | A1 * | 7/2012 | Swaminathan | 713/150 |
| 2012/0198494 | A1 * | 8/2012 | White | 725/38 |
| 2012/0260278 | A1 * | 10/2012 | Lambert et al. | 725/14 |
| 2012/0272259 | A1 * | 10/2012 | Cortes et al. | 725/14 |

* cited by examiner

*Primary Examiner* — Nasser Goodarzi
*Assistant Examiner* — Michael B Pierorazio
(74) *Attorney, Agent, or Firm* — Lowenstein Sandler LLP

(57) ABSTRACT

Techniques for determining user behavior related to media are described. A media file containing media is received. The media is partitioned into segments. The user-interaction analyzer monitors user behavior with respect to viewing the media and the segments. The user's behavior with respect to viewing the segments is logged. Normal user behavior with respect to the media is determined and stored. Logged user behavior with respect to interaction with a segment of the media is compared with the normal user behavior with respect to the media. Logged user behavior of a particular media segment that deviates from normal relative to the determined normal user behavior is determined. A particular media segment that is not normal is tagged. A user device is configured to display indicia indicating user behavior related to media to help inform which parts users tend to like the most.

18 Claims, 7 Drawing Sheets

101

```
┌─────────────────────────────────────────────────────────────┐
│ ○ Video Sharing                                      ▭ ▣ ☒ │
│ File  Edit  View  History  Bookmarks  Tools  Help         ¤ │
│ ◁▫▷▫⟲⊗  ⌂ □http://www.videosharing.com │Q  □▪Search   │Q │
│                                                              │
│  ⎛Video⎞      Sign Up │My Account │History│ Help │Log in │Site ○│
│  Share Yourself  Videos  │Categories│Channels│Community│ ⊗ Upload│
│                   ┌─ducati──────┐ ┌Search┐ ┌Search┐         │
│  Search results for "ducati"  ╲103        1-20 of about 6,000│
│  Sort by: Relevance │Date Added │View Count │Rating  Display: ▦ ▦▦│
│  ┌──────┬───────────────────────────────────────────────────┐│
│  │      │                                        ★★★★☆      ││
│  │ 🏍   │ La storia della Ducati Superbike                  ││
│  │      │ From early Pantah F1 to 1068, 25      From: ElGladiatour││
│  │ ╲105 │ years of Ducati superbike. Forza      Views: 81,263││
│  │      │ Daemo, Forza Ducati...Ducati          Added: 11 Months ago││
│  │      │ Superbike 999 888 915 748 995 998     More: Autos & Vehicle││
│  │      │ F1 Desmoquatiro                                    ││
│  │      │ Tags: Ducati Superbike 999 888 915                 ││
│  │      │       748 995 998 F1 Desmoquatiro Deemo            ││
│  │      │ Time: 02:38                                        ││
│  ├──────┼───────────────────────────────────────────────────┤│
│  │      │ Lamborghini Gallardo vs. Ducati 999   ★★★☆☆        ││
│  │ 🚗   │                                                    ││
│  │      │ Fith Geer clip featuring Lamborghini  From: Jay302 ││
│  │ ╲107 │ Gallardo vs. Ducati 999 .. Racing     Views: 285,614││
│  │      │ supercar superbike Fifth Gear         Added: 1 year ago││
│  │      │ Tags: racing supercar superbike fifth More: Howto & Style││
│  │      │       gear                                         ││
│  │      │ Time: 03:03                                        ││
│  ├──────┼───────────────────────────────────────────────────┤│
│  │      │ Mazda RX7 Tuned Vs Ducati 748         ★★★★☆        ││
│  │ 🗺   │ MAZDA ITS GANSTA .... Mazda RX7       From: MRGEYEZ││
│  │      │ Tags: Mazda Rx7                       Views: 215,493││
│  │      │ Time: 03:33                           Added: 1 year ago││
│  │      │                                       More: Sports ││
│  ├──────┼───────────────────────────────────────────────────┤│
│  │      │ Ducati 848 Elcma 2007                 ★★★☆☆        ││
│  │      │ Ducati 848 Elerra 2007 by Motoblogit..From: blogvideo││
│  └──────┴───────────────────────────────────────────────────┘│
│ Done                                                         │
└─────────────────────────────────────────────────────────────┘
```

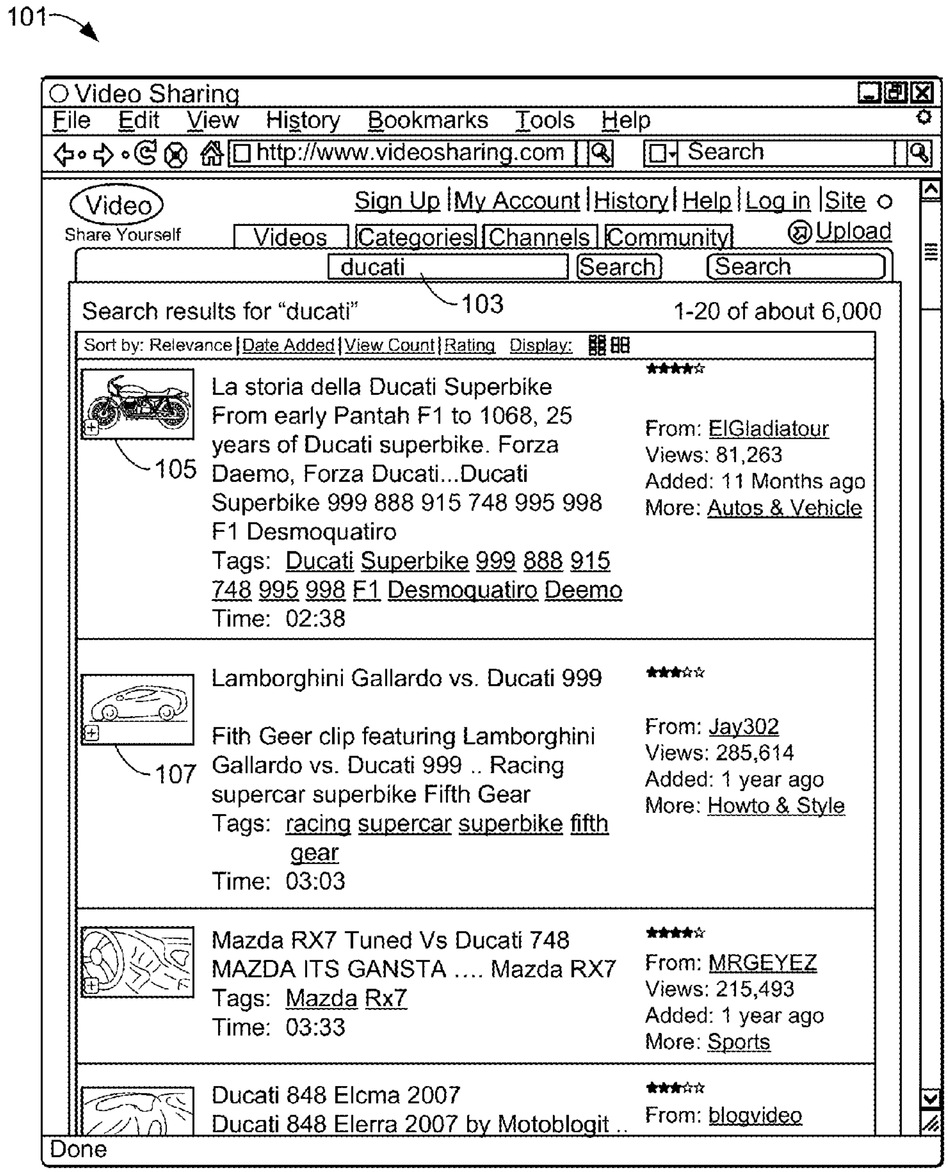

Fig. 1

USER BEHAVIOR INDICATOR

BACKGROUND

Video hosting refers to service where users distribute videos, typically found on the Internet. Video-hosting websites allow users to discover videos available over the Internet. A user discovers videos of interest by submitting a search query to the video-hosting website or browsing in different categories or channels of the video-searching website. Using either approach, the video host presents the user with a list of videos from which he or she can choose.

Once a user finds a video of interest and selects a link to the video, the user loads a webpage associated with the video and views the video and/or details of the video. The video-hosting website allows a user to search and view videos contained within the video-hosting website, or videos located on or sourced from other websites.

SUMMARY

Described herein are techniques for determining user behavior related to media interaction, such as viewing a video. Techniques for determining user behavior related to media are described. A media file containing media is received. The media is partitioned into segments. The user-interaction analyzer monitors user behavior with respect to viewing the media and the segments. The user's behavior with respect to viewing the segments is logged. Normal user behavior with respect to the media is determined and stored. Logged user behavior with respect to interaction with a segment of the media is compared with the determined normal user behavior with respect to the media. Whether logged user behavior of a particular media segment deviates from normal relative to the determined normal user behavior is determined. Responsive to a not normal determination of a particular media segment, that segment is tagged. The tagged segment is communicated to a user device configured to display indicia indicating user behavior related to media to help inform which parts users tend to like the most.

BRIEF DESCRIPTION OF THE FIGURES

The detailed description refers to the following accompanying drawings:

FIG. 1 displays a screen shot illustrating an example of a user interface displaying videos associated with a user search query in accordance with one or more implementations described herein.

DETAILED DESCRIPTION

Overview

Figure 2:
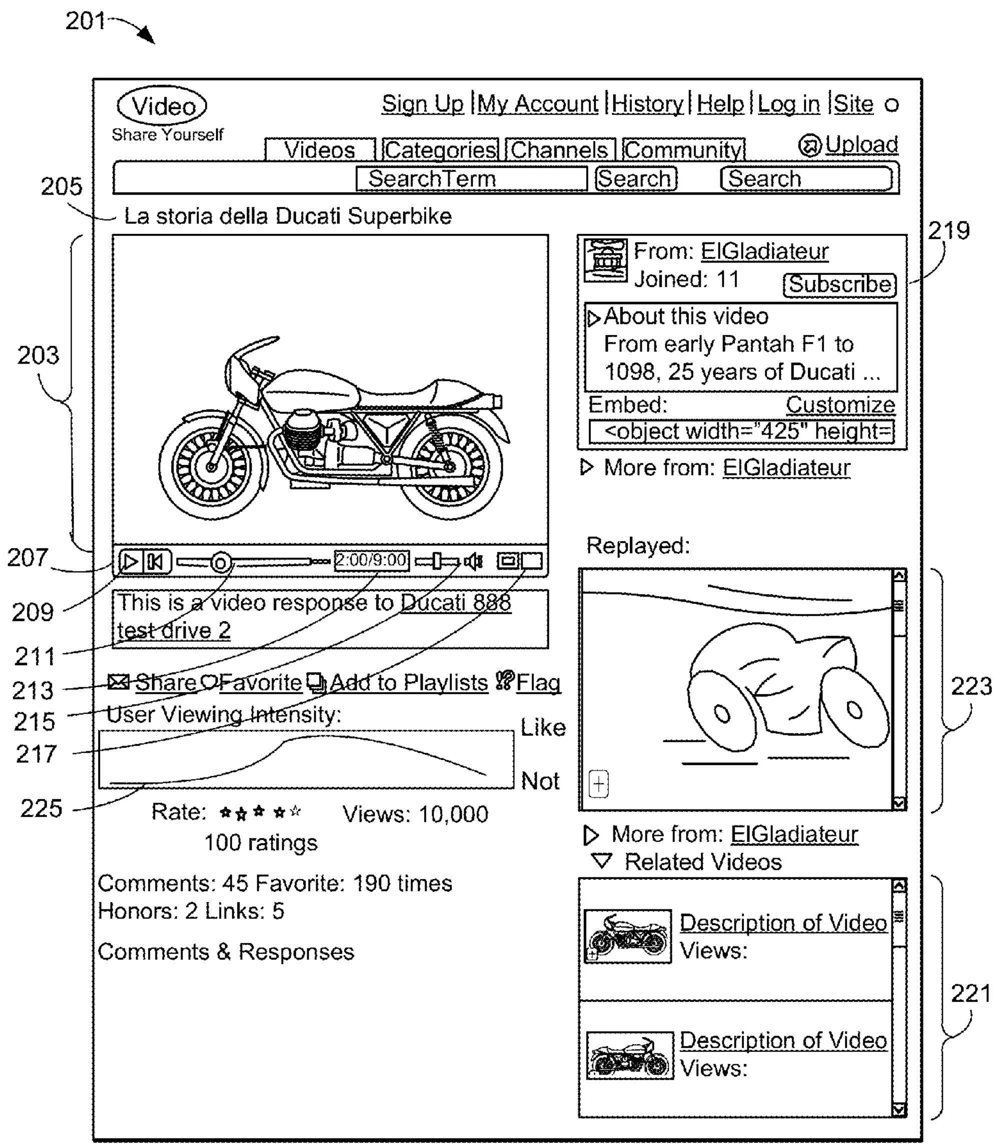
FIG. 2 displays a screen shot illustrating an example of a user interface displaying the target video in accordance with one or more implementations described herein.

Content delivery systems provide Internet users access to an enormous selection of media content, such as video. Nonprofessionals produce a large proportion of this video content, resulting in many videos considered less interesting or too long to be of interest. Many times when a viewer selects a video, that video contains segments of material in which the user is less interested. The user must put forth effort to view the content of the individual videos to determine if the video contains relevant material. Accordingly, users can view videos without relevant or interesting content instead of related videos with truly relevant or interesting material.

In addition, many videos that people watch online, even when professionally produced, are quite long, for example an hour or longer. Sometimes there are parts that are less interesting that users choose to skip. Other times there are parts that are particularly interesting that users repeat. For example, soccer matches are often recorded live, then replayed in their entirety. Soccer matches consist of two 45 minute periods. Often during the match, the teams are controlling the ball and jockeying for advantage. These long stretches can be interrupted with exhilarating segments, such as when a goal is scored, a goalie makes a great save, a penalty kick is rewarded, and the like.

When viewing such video, each user discovers the parts that are less interesting or more interesting. And each user has to find the parts that matter or choose to abandon the video. By way of further example, a music video might start slow and not have interesting initial content. Later, the music video may have a spectacular visual and song, but the user misses this interesting content because the user might have stopped watching or skipped to the wrong part.

Still further, sometimes someone who is passionate about a topic or managed to find an interesting part of a video shares that video. When the video is shared, the people viewing might not have the interest to watch the full video to find the interesting part, which is necessary in order for them to be able to decide whether the video is worth resharing. More content sharing is important for a social network to increase activity.

FIG. 1 displays an example user interface 101 illustrating a result page responsive to a user querying the keyword "Ducati" into a dialog box 103, for videos related to products sold by Ducati Motor Holding S.P.A. For the keyword, the user interface 101 lists appropriate videos retrieved from a video repository. Examples of appropriate videos include "La storia della Ducati Superbike" 105 and "Lamborghini Gallardo vs. Ducati 999" 107. After reviewing the result page, the user selects a target video from the result page to watch.

After selection of the target video, a front-end interface transmits and presents the requested video and related-video links to the user. In addition, icon or thumbnail views of related videos accompany the links, along with associated metadata such as, for example, title, author, tags, and rating. For example, if a user provides the front-end interface with a request for a specific video with the title of "La storia della Ducati Superbike", the front-end interface presents the selected target video to the user along with links to related videos.

FIG. 2 displays an example webpage 201 playing the video 203 with the title of "La storia della Ducati Superbike" 205. The webpage 201 contains controls 207 that allow a user to control how and when to play the video 201. Such controls 207 can include, for example, a play/pause button 209, a progress bar 211 that allows a user to skip ahead or repeat, a timer 213, a volume control 215, and a screen size adjustment 217. A video-information box 219 contains information about the video. A related-videos box 221 contains links to videos that a video-hosting service has determined to display as related to video 203. A video-serving module retrieves the related videos from a video repository for user presentation. If a user selects a link of a related video, the video-hosting service 201 plays the related video.

In FIG. 2, a segment of the video that is being displayed could be the beginning, where less interesting information may be displayed. For example, perhaps the beginning of a video has advertising and technical information such as engine displacement, top speed, 0-60 miles per hour time, and the like.

Figure 3:
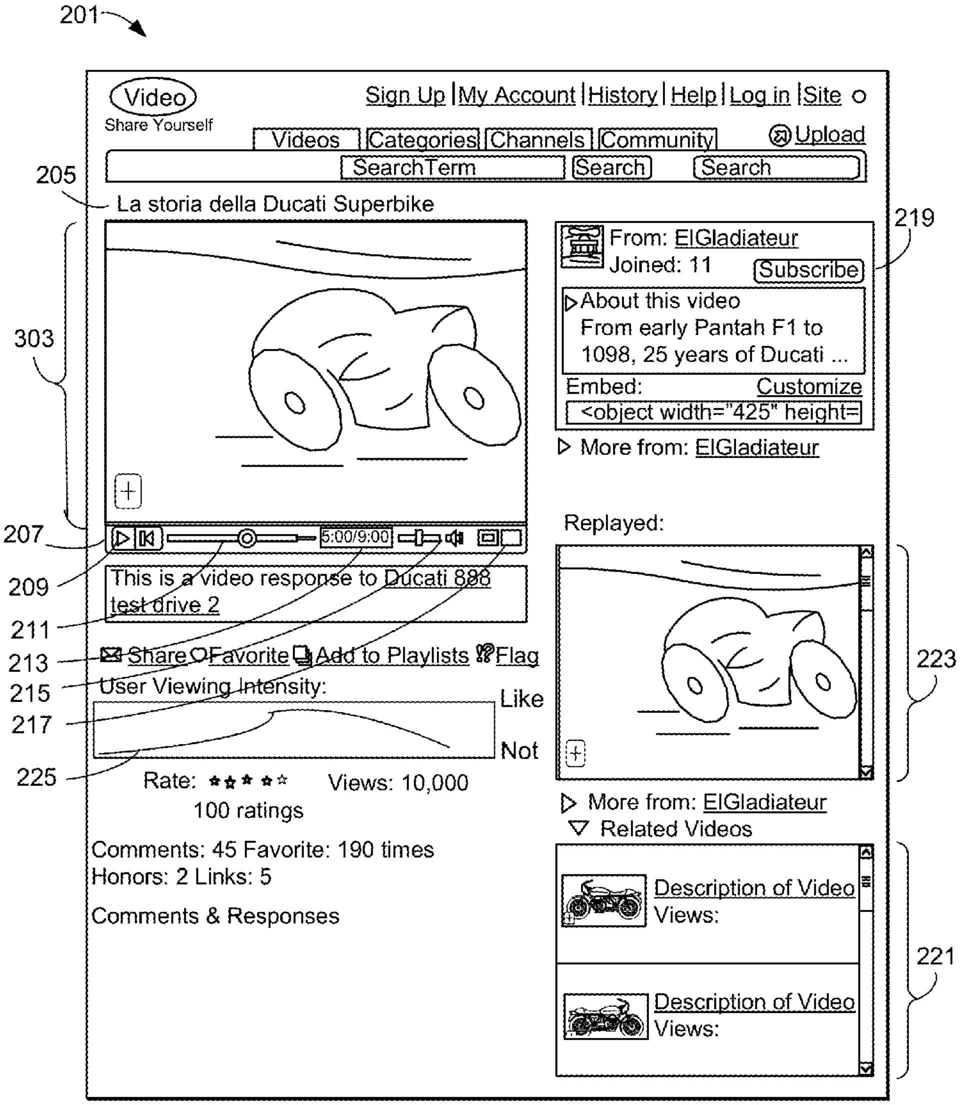
FIG. 3 displays a screen shot illustrating the example of FIG. 2 with the target video at a different play segment in accordance with one or more implementations described herein.

FIG. 3 displays the same example webpage 201; however, in FIG. 3 a later segment of the "La storia della Ducati Superbike" video 303 is displayed. For example, this later segment might show interesting highlights from a motorcycle race.

Techniques for determining user behavior related to media interaction, such as viewing a video, are described. The term 'techniques' refers to device(s), system(s), method(s) and/or computer-readable instructions as permitted by the context above and throughout the document. A media file containing media is received. The media is partitioned into segments. The user-interaction analyzer monitors user behavior with respect to viewing the media and the segments. The user's behavior with respect to viewing the segments is logged. Normal user behavior with respect to the media is determined and stored. Logged user behavior with respect to interaction with a segment of the media is compared with the determined normal user behavior with respect to the media. Whether logged user behavior of a particular media segment deviates from normal relative to the determined normal user behavior is determined. Responsive to a not normal determination of a particular media segment, that segment is tagged. The tagged segment is communicated to a user device configured to display indicia indicating user behavior related to media to help inform which parts users tend to like the most.

Referring back to FIG. 2, segment ratings are displayed to reflect user behavior related to media. In one example, a viewer intensity chart 225 is depicted. The viewer intensity chart 225 can be used in conjunction with the progress bar 211. The viewer intensity chart 225 provides a visual depiction of which parts of the video other users liked or not. In FIG. 2, the video is at the early stages—in this example 2:00 minutes. Relatively less interesting content is being displayed, as indicated by the viewer intensity chart 225. Referring to FIG. 3, the video is at a later stage—here 5:00 minutes. This later segment showing interesting highlights from a motorcycle race is identified as relatively more interesting content, as indicated by the viewer intensity chart 225.

This brief overview, as well as section titles and corresponding summaries, are provided for the reader's convenience and are not intended to limit the scope of the claims or the proceeding sections.

The Internet

As mentioned previously, video hosting is typically found on the Internet. The Internet connects a global network of computers. Network servers support hypertext capabilities that permit the Internet to link together websites. Hypertext is text displayed on a computer or other electronic devices with references (for example, hyperlinks) to other text. Users navigate the Internet through graphical-user interfaces (GUI). Uniform-resource locators (URLs) identify specific websites and web pages. URLs also identify the address of the website to be retrieved from a network server. The transfer control protocol/internet protocol (TCP/IP) transfers information.

The Internet typically uses a hypertext language referred to as the hypertext mark-up language (HTML). HTML permits content providers to place hyperlinks within web pages. These hyperlinks connect related content or data, which may be found on multiple Internet-host computers. HTML document links retrieve remote data by use of hypertext transfer protocol (HTTP). When a user clicks on a link in a web document, the link icon in the document contains the URL that the client application employs to initiate the session with the server storing the linked document. HTTP is a protocol used to support the information transfer.

System Architecture

Figure 4:
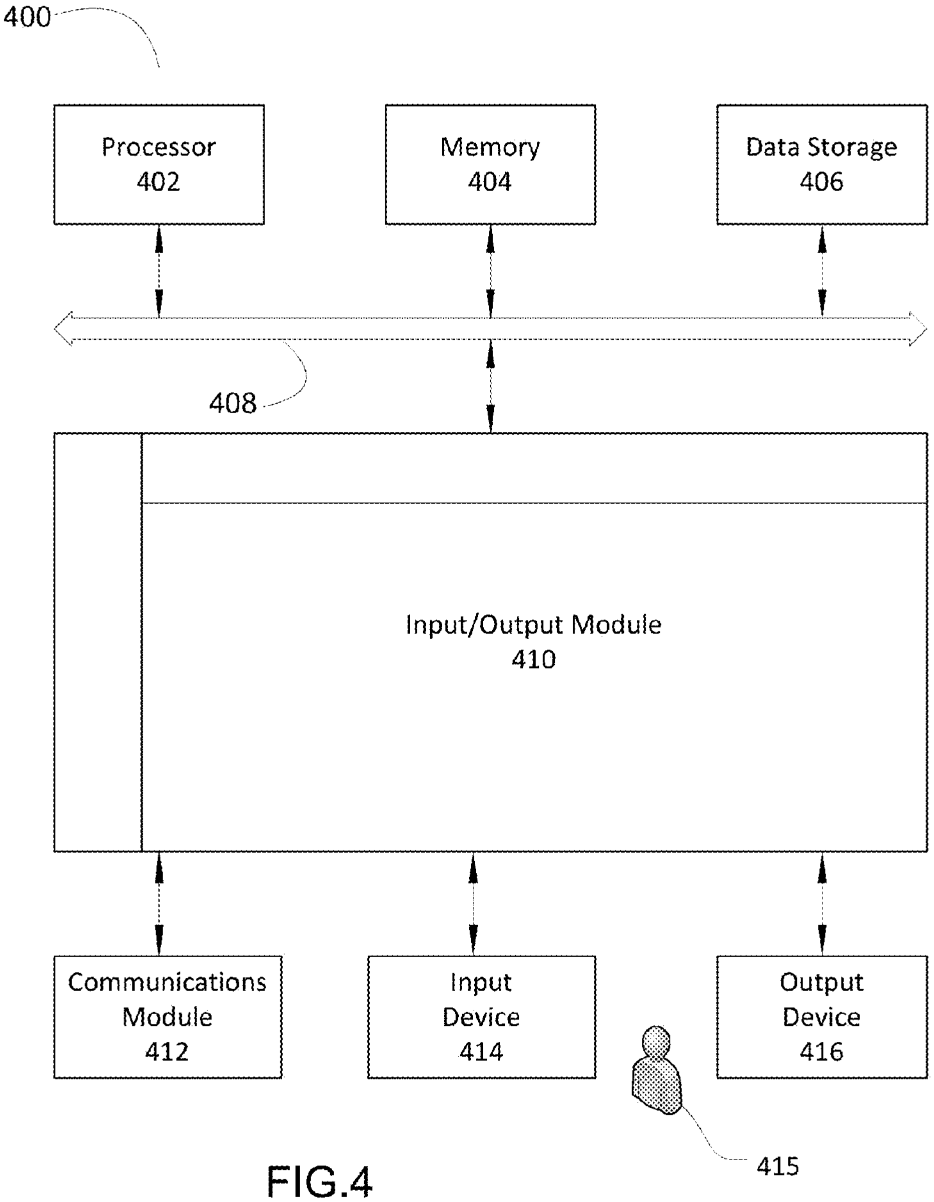
FIG. 4 displays a high-level block diagram of example computer architecture in which techniques for determining user behavior related to videos can be employed in accordance with one or more implementations described herein.

FIG. 4 displays a high-level block diagram of example computer architecture in which techniques for determining user behavior related to videos described herein can be employed. The computer system 400 can include, in addition to hardware, computer-executable instructions stored in memory 404. A bus couples the memory 404 for storing information and instructions executable by processor 402. Special purpose logic circuitry can supplement or incorporate the processor 402 and the memory 404.

The instructions may be stored in the memory 404 and implemented in one or more computer program products. Computer program products can be one or more modules of computer program instructions encoded on a computer readable medium for execution by, or to control the operation of, the computer system 400. Memory 404 may store temporary variable or other intermediate information during execution of instructions executable by the processor 402.

The computer system 400 further includes a data storage device 406 coupled to bus 408. The data storage device 406 stores information and instructions. An input/output module 410 may couple computer system 400 to various devices. The input/output module 410 can be any input/output module. Examples of input/output modules 410 include data ports such as universal serial bus (USB) ports. The input/output module 410 connects to a communications module 412. Examples of communications modules 412 include networking interface cards, such as Ethernet cards and modems.

The input/output module 410 connects to a number of devices, such as an input device 414 and/or an output device 416. Examples of input devices 414 include a keyboard and a pointing device such as, for example, a mouse, by which a user 415 can provide input to the computer system 400. Examples of output devices 416 include display devices such as, for example, a liquid crystal display (LCD) monitor for displaying information to the user 415.

According to one aspect, the techniques can be implemented using a computer system 400 in response to processor 402 executing one or more sequences of one or more instructions contained in memory 404. Another machine-readable medium, such as data storage device 406, may read such instructions into memory 404. Execution of the sequences of instructions contained in memory 404 causes processor 402 to perform the process steps described herein.

Computing system 400 can include clients and servers. A client and server are generally remote from each other and typically interact through a communication network. The relationship of client and server arises by virtue of computer programs running on the respective computers and having a client-server relationship to each other.

Figure 5:
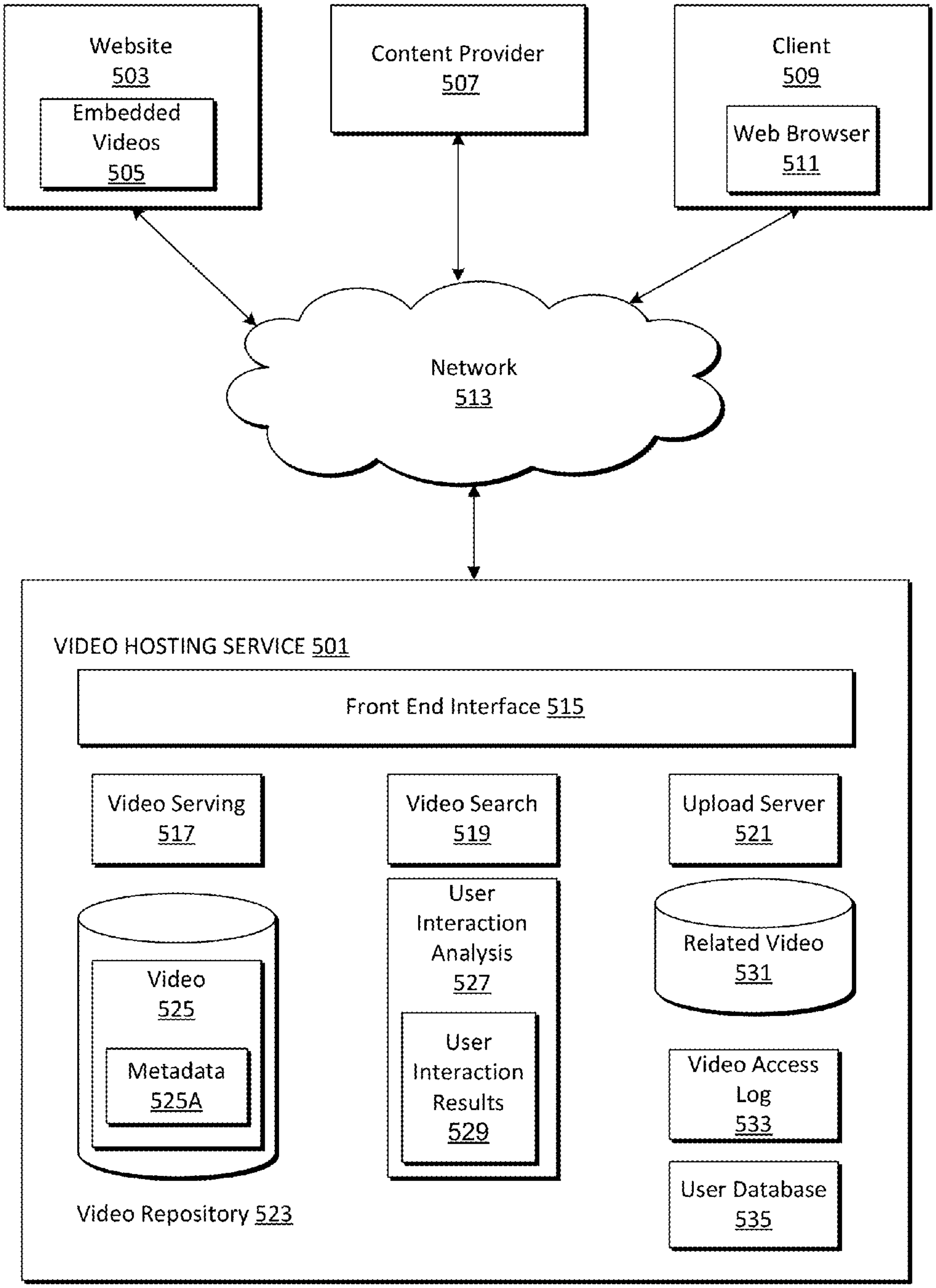
FIG. 5 displays a high-level block diagram of an example media-hosting service system architecture in which techniques for determining user behavior related to videos can be employed in accordance with one or more implementations described herein.

FIG. 5 shows a high-level block diagram of an example video-hosting service 501 that determines user behavior related to videos. Generally, the video-hosting service 501 represents any system that allows users to access video content via searching and/or browsing interfaces. In one implementation, the video-hosting service 501 makes available additional types of media. In addition to video, examples of media include audio media files such as music, podcasts, audio books, and the like; multimedia presentations; and so forth.

The video-hosting service 501 represents a system that stores and provides videos to users. The video-hosting service 501 communicates with a number of content providers 507 and clients 509 via a network 513. The configuration and management of large networks includes storage devices and computers that are communicatively coupled to dissimilar computers and storage devices. The network 513 is typically the Internet, but may be any network.

The client 509 is a computing device that executes client software such as, for example, a web browser 511 to load a website. The client 509 connects to the video-hosting service 501 via the network 513 to display videos. The client 509 can include a variety of different computing devices. Examples of computing devices include digital assistants, personal digital assistants, cellular phones, mobile phones, smart phones, laptop computers, tablet computers, and the like.

In some implementations, the client 509 includes an embedded-video player such as, for example, the FLASH® video player available from Adobe Systems Incorporated. Of course, the client 509 can include other players adapted for the video file formats used in the video-hosting service 501.

The videos are sourced from user uploads, searches or crawls of other websites or databases of videos, and combinations thereof. The video-hosting service 501 obtains data from various external websites 503. The websites 503 include one or more web pages accessible to the video-hosting service 501 via the network 513. The web pages include, for example, textual content such as HTML.

The user of the content provider 507 performs various content-provider functions. Examples of content-provider functions include uploading a video to the video-hosting service 501, editing a video stored by the video-hosting service 501, editing metadata information about a video, editing content-provider preferences associated with a video, and the like. For the sake of clarity, FIG. 5 depicts only one instance of website 503 and content provider 507, though there could be any number of each. In addition, while only one client 509 is shown, the video-hosting service 501 supports and communicates with very large numbers (such as millions) of clients at any time.

The video-hosting service 501 includes a front-end interface 515, a video-serving module 517, a video-search module 519, an upload server 521, a video repository 523, a user-interaction analysis module 527 including a user-interaction results database 529, a related-videos database 531, a video access log 533, and a user database 535. Other conventional features such as, for example, firewalls, load balancers, authentication servers, application servers, failover servers, site-management tools, and so forth are not shown so as to illustrate more clearly the features of the system.

The front-end interface 515 interfaces between the client 509 and the various components of the video-hosting service 501. The upload server 521 receives video content from a content provider 507. The video repository 523 contains a set of videos 525 submitted by content providers 507. The video repository 523 contains any number of videos 525 such as, for example, tens of thousands or hundreds of millions. The video repository 523 can be implemented using a database or file system, with indexing system for indexing and retrieving videos. A unique video identifier distinguishes each video from other videos, such as a textual name (for example, the string "a91qrx8"), an integer or any other way of uniquely naming a video.

In addition to audiovisual content, the videos 525 include associated metadata 525A. Examples of metadata include textual metadata such as a title, description, and/or tags provided by a content provider 507 who uploaded the video or metadata obtained by an analysis of a video done by the video-hosting service 501.

Using the video-search module 519, clients 509 search for videos from the video-hosting service 501 using keywords, browse various categories or channels, review play lists from other users or the system administrator (such as collections of videos forming channels), view videos associated with particular user groups (such as communities), and the like. The video-search module 519 locates appropriate videos in the video repository 523 to return to the client 509. The video-serving module 517 provides video data from the video repository 523 to the client 509. The user interaction-analysis module 527 determines when user behavior with respect to viewing the media segment is not normal. The user-interaction database 529 stores tagged media segments, as detailed below.

Various containers or wrappers package the videos 525. A container is a meta-file format whose specification describes how different data elements and metadata coexist in a computer file. Examples of meta-file format include audio video interleave or interleaved (AVI) multimedia container standard specified available from Microsoft Corporation; MP4 multimedia-container standard based on the International Organization for Standardization (ISO) base-media-file format defined in MPEG-4 Part 12 and JPEG-2000 Part 12; QuickTime file format (QTFF) (.mov) developed by Apple Inc.; and the like.

Video codecs encode the videos 525. A video codec enables video compression and/or decompression for digital video. An example of a video codec is the advanced video coding (AVC) standard H.264/MPEG-4, Part 10 developed by the International Telecommunication Union (ITU) T Video Coding Experts Group (VCEG) together with the (ISO)/International Electrotechnical Commission (IEC) Moving Picture Experts Group.

User Behavior

As previously introduced, techniques for determining user behavior related to media to help inform which parts users tend to like the most are described herein. Example implementations rate segments of media according to how interesting (or less interesting) the segments of media are to typical users. User experience is improved by providing indicators to show where these trends tend to happen to help users discover the content that matters. These interactions are described below with respect to an implementation for video media.

A video is partitioned into segments. The segments should be sufficiently long that a statistically significant measure can be made but sufficiently short that meaningful distinctions on the interest level displayed by a typical viewer when viewing the segment can be measured. In one implementation, the segments can be approximately 10 seconds each.

Segments of a video are scored based on the interest level displayed by a typical viewer when viewing the segment. Interest level can be determined in various ways. For example, users repeating a segment, skipping a segment, pausing on a segment, and/or repeating a segment can be utilized to determine interest levels.

Associated with each video, the number of pauses, plays, skips, and/or repeats are logged. Initially, video use is monitored to identify behavior that deviates from normal. In one implementation, the average number of pauses, plays, skips or repeats for a given video segment are determined. This establishes a baseline level of user interest against which to compare the user interest with respect to a given segment.

The number of pauses, plays, skips or repeats for a given segment are determined. The number of pauses, plays, skips or repeats for a given segment are compared against the number of pauses, plays, skips or repeats in the baseline level of user interest.

The standard deviation or dispersion from the baseline level of user interest is determined. A low standard deviation indicates that the data points tend to be very close to the mean, whereas high standard deviation indicates that the data points are spread out over a large range of values. A threshold standard deviation level is determined that represents a statistically significant level of user interest. In one implementation, if the number of pauses, plays, skips or repeats extends over a full standard deviation greater than 'normal', then this time segment can be tagged.

In further implementations, more sophisticated metrics can be monitored and measured. For example, user comments on the video can be utilized, such as when a user comment mentions a specific moment in the video. Links into a specific point in the video can be utilized.

Also, users can directly enter their interest levels. The user can provide an 'interesting level' per segment, or provide comparative measures, as in 'segment 1 is more interesting than segment 2'. An example of how to train a model based on relative human judgment (as opposed to based on human ordinal scoring) is seen in Chechik, Sharma, Shalit, Bengio, "Large Scale Online Learning of Image Similarity Through Ranking", 11 Journal of Machine Learning Research 1109 (March 2010) (available at jmlr.csail.mit.edu/papers/v11/chechik10a.html).

Additional viewer interactions signaling deeper interactions with a video can be measured. Examples include whether a viewer takes action on a segment to share, post a comment, chat, make an annotation, transition from a seek action to a play action, go to full screen, and/or retract from full screen. The latter example may indicate a less interesting segment, whereas the former examples may indicate an interesting segment.

Regression analysis and other types of filtering (for example, smoothing) operations may be performed on some of the measured quantities described above. Regression analysis refers to a statistical technique for estimating the relationships among variables. Various examples of regression analysis include the linear regression model, simple linear regression, logistic regression, nonlinear regression, nonparametric regression, robust regression, and stepwise regression.

In a further implementation, looking at data about user behavior across just all users can leave out insights that come from focusing on a particular user or group of users. Example of categorizing a particular user or group of users include particulars such as language, location, and interests. A further example is user information such as a user's location.

For example, consider a video about an incredible soccer play of the hometown team. The video could have data that is useful and interesting to the user when considering who in the team's area watched the video. Different groups might be more likely to replay and pause particular parts of the video. Also, the identified parts can be based on the interests of the user and the interest of the people who watched the video. For example, people interested in racing might tend to jump to a particular part that they find interesting, while people interested in motorcycles might tend to jump to a particular part that they find interesting. This information can be surfaced to other people interested in racing or motorcycles.

Figure 6:
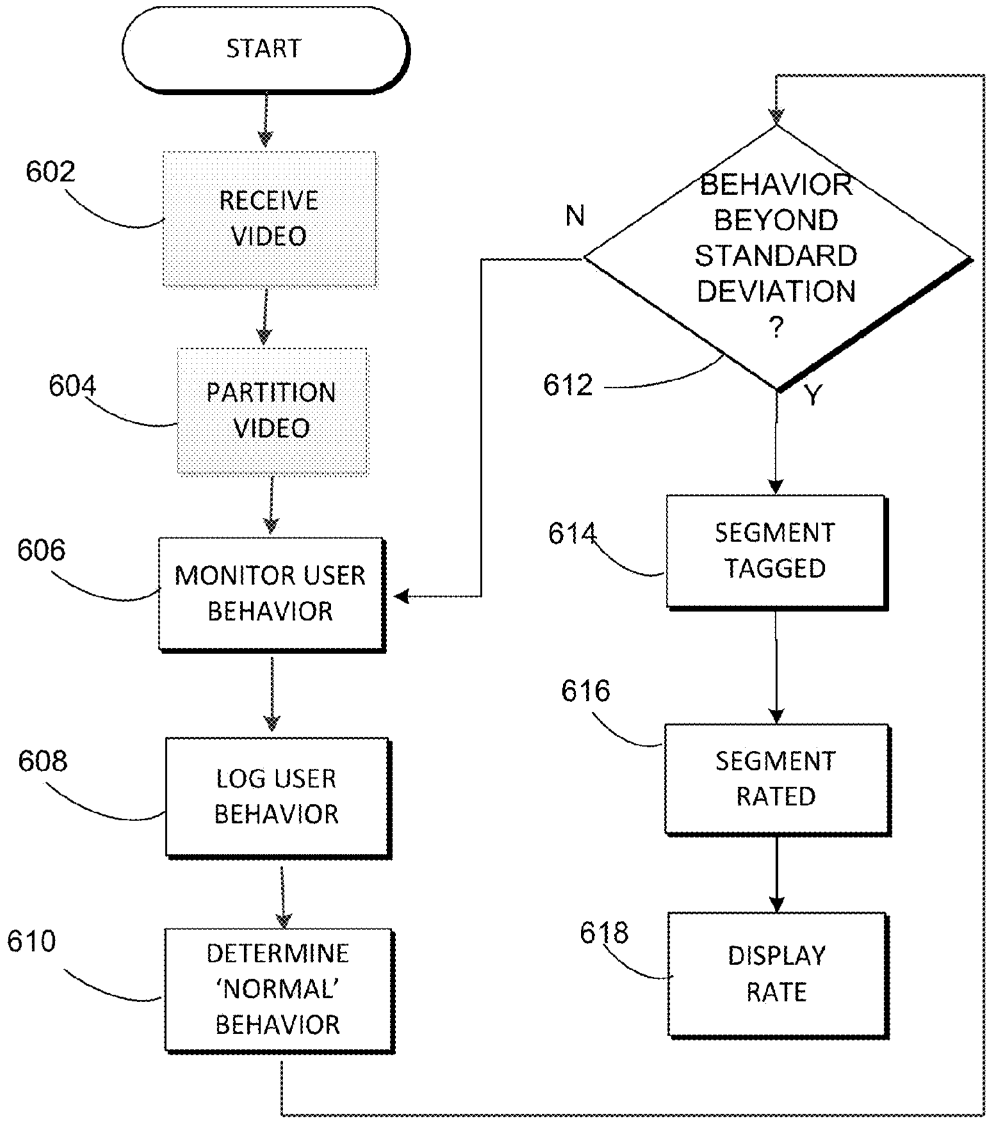
FIG. 6 displays a flow chart of an example process for determining user behavior related to videos in accordance with one or more implementations described herein.

FIG. 6 is a flow chart illustrating operations of the video-hosting service 401 in determining user behavior related to videos according to one implementation. Other implementations perform the steps of FIG. 6 in different orders. In addition, other implementations include different and/or additional steps than the steps described herein. In one implementation, the steps of FIG. 6 are performed by one more executable programs that are part of the video-hosting service 401 in response to the video being uploaded to the video-hosting service 401 for storage. In another implementation, the steps of FIG. 6 are performed by the video-hosting service 401 in response to a user request to view the specific video stored on video-hosting service 401.

When a video is received (602), the video is partitioned into segments (604). Users' behavior with respect to the segments is monitored (606). User behavior with respect to the segments is logged (608). 'Normal' behavior is determined (610). If the number of pauses, plays, skips and/or repeats for a given video segment exceeds a standard deviation, then the segment is tagged (612). Tagged segments are rated based on the number of pauses, plays, skips, and/or repeats that exceed a standard deviation (616). Segment ratings are displayed with the video (618).

Figure 7:
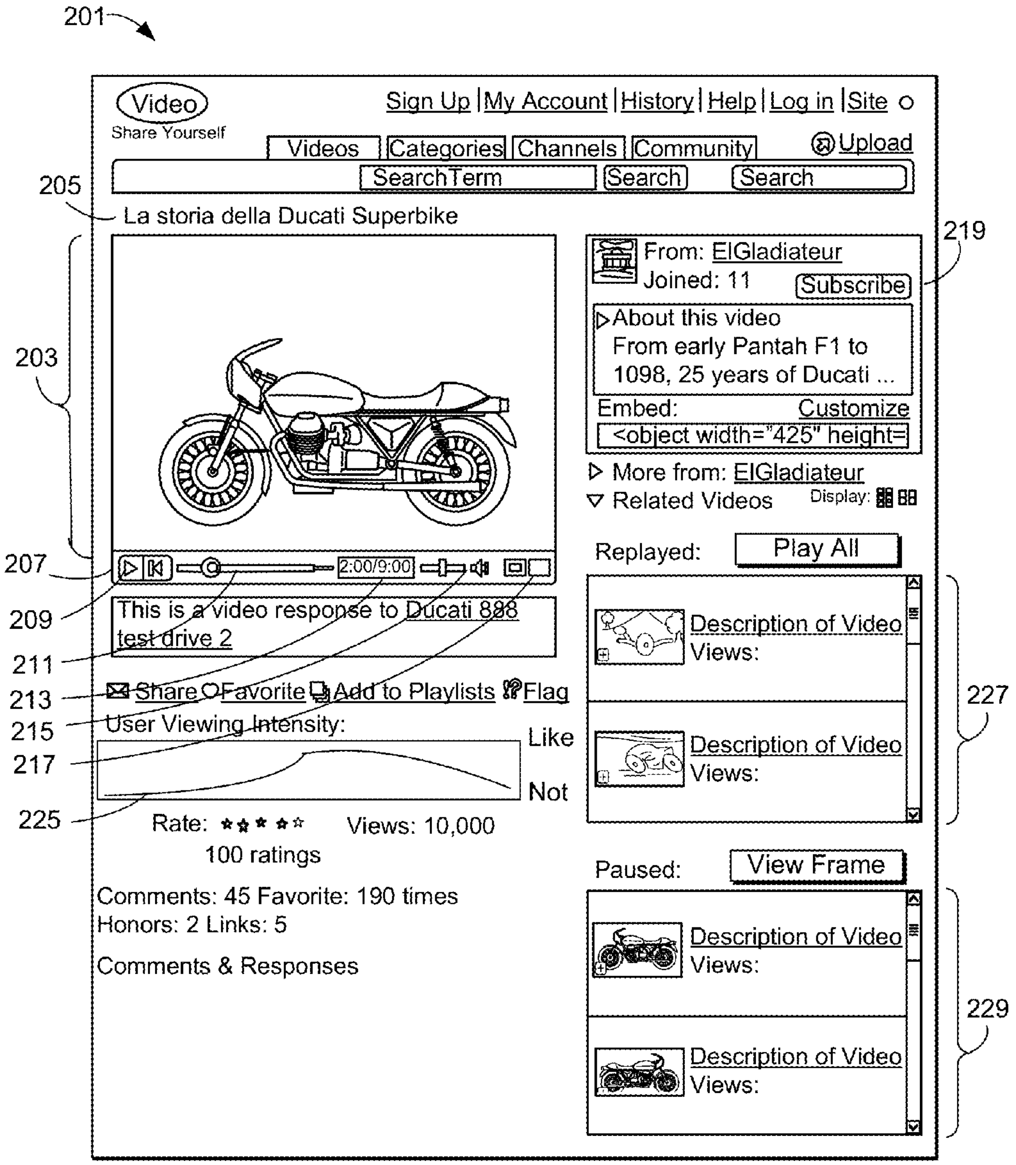
FIG. 7 displays a screen shot illustrating another example of a user interface displaying the target video in accordance with one or more implementations described herein.

Referring to FIG. 7, another example of a display to show where these trends happen to help users discover the content that matters is seen, where like numbers depict like elements from FIG. 2. Again, a viewer intensity chart 225 is depicted. Again, the user again is provided with a visual image of what in the video other users 'like'.

In this example, a highlight box 227 displays the segments of the video where users tend to watch more heavily that the rest of the video. Clicking 'play all' shows the replayed parts of a video in a row, which is useful because sometimes the replayed parts can be small segments and otherwise clicking on each one individually would take a while.

In addition, in this example a paused box 229 displays the segments of the video where users tend to pause more heavily than the rest of the video. Clicking "view frames" shows frame-by-frame the parts of the video that were paused or shows that segment in slow motion or with frame transitions to let the users focus on the content that users identified as interesting. On both examples, images are shown of the context of the video at those points to help the user decide. For example, the replayed/paused/played parts might show highlights of a remarkable motorcycle race, while otherwise watching the first part of the video might focus on someone giving historical context of the race.

Thus, by utilizing techniques for determining user behavior related to media described herein users will waste less valuable time with media without relevant or interesting content instead of related media with truly relevant or interesting material.

For the purposes of convenience, the uploaded media is sometimes described in a ‘video’ or ‘videos’ implementation; however, limitations on the types of uploaded media are not intended. Thus, the operations described herein apply to any type of media, not only videos. Examples of media include audio files such as music, podcasts, audio books, and the like; multimedia presentations; and so forth.

The implementation described herein is not inherently related to any particular hardware or other apparatus. The operations of the video-hosing service can be controlled through either hardware or through computer programs installed in computer storage and executed by the processors of servers. One or more processors in a multi-processing arrangement also may be employed to execute the sequences of instructions.

When embodied as hardware, the hardware may be specially constructed for the required purposes or the hardware may include a general-purpose computer selectively activated or reconfigured by a computer program stored on a computer-readable medium. In addition, the implementation described herein is not limited to any particular programming language.

The video-hosting service may be implemented using a single computer or a network of computers, including cloud-based computing. The computers can be server-class computers including one or more high-performance central processing units (CPUs), memory such as, for example, one gigabyte (1 GB) or more of main memory, as well as 500 GB to two terabyte (2 TB) of computer-readable persistent storage, network interface, peripheral interfaces, and other well-known components.

The computers can run an operating system. Examples of operating systems include the LINUX® computer-operating system or variants thereof and the like. LINUX® computer-operating system is an open-source operating system that is available under a general-public license administered by The Linux Foundation, 1796 18th Street, Suite C, San Francisco, Calif. 94107. Of course, other types of operating system and computers can be used, and it is expected that more powerful computers developed in the future can be configured in accordance with the teachings herein.

In addition to the Internet, the network may be any network. Examples of networks include local area networks (LAN), metropolitan area networks (MAN), campus area networks (CAN), wide area networks (WAN), mobile wired or wireless networks, private networks, virtual private networks, and the like. In addition, all or some of links can be encrypted using conventional encryption technologies. Examples of encryption technologies include the secure-sockets layer (SSL), secure http, virtual private networks (VPNS), and the like. Other implementations utilize custom and/or dedicated data communications technologies instead of, or in addition to, the communications technologies described above.

The terms client and content provider as used herein may refer to software providing client and content-providing functionality, to hardware devices on which the software executes or to the entities operating the software and/or hardware. The term ‘website’ represents any computer system adapted to serve content using any internetworking protocols, and is not limited to content uploaded or downloaded via the Internet or HTTP.

The term computer-readable media includes computer-storage media. Example include magnetic-storage devices such as hard disks, floppy disks, and magnetic tape; optical disks such as compact disks (CD) and digital-versatile disks (DVD); magnetic-storage devices such as digital tapes, floppy disks, and magneto-resistive-random-access memory (MRAM); non-volatile memory such as read-only memory (ROM), erasable-programmable-read-only memory (EPROMs), and electrically-erasable-programmable-read-only memory (EEPROMs); volatile memory such as random-access memory (RAM), dynamic random access memory (DRAM), ferroelectric-random-access memory (FeRAM), and static-random-access memory (SRAM); or any type of media suitable for storing electronic instructions.

Furthermore, at times arrangements of operations have been referred to as modules or by functional names, without loss of generality. The term ‘module’ refers to computational logic for providing the specified functionality. The division of functionality between components, the naming of modules, components, attributes, data structures or any other programming or structural aspect is merely exemplary, and not mandatory or significant. In addition, other implementations may lack modules and/or distribute the described functionality among modules in a different manner. Functions performed by a component may instead be performed by multiple components, and functions performed by multiple components may instead performed by a single component. In general, functions described in one implementation as performing on the server side can be performed on the client side in other implementations and vice versa, if appropriate.

Although the subject matter has been described with a specific implementation, other alternatives, modifications, and variations will be apparent to those skilled in the art. Accordingly, the disclosure is intended to be illustrative, but not limiting, and all such alternatives, modifications, and variations are within the spirit and scope of the following claims.

What is claimed is:

1. A system comprising:
- a database configured to store media files;
- a processor communicatively coupled to the database;
- a user-interaction analyzer executable by the processor and configured to:
  - receive a media file containing media;
  - partition the media into segments;
  - monitor user behavior with respect to the media and the segments, the user behavior comprising viewing behavior with respect to the media and the segments;
  - log user behavior with respect to the segments in the database;
  - determine normal user behavior with respect to the media;
  - store such normal user behavior in the database;
  - compare logged user behavior with respect to a segment of the media with the determined normal user behavior with respect to the media;
  - determine whether logged user behavior of a particular media segment of the media file deviates from normal relative to the determined normal user behavior;
  - responsive to an not normal determination of a particular media segment, tag in the database the particular media segment as not normal; and
  - an interface operatively associated with the database, the interface being configured to communicate with a user device regarding the segments tagged as not normal.

2. The system of claim 1, wherein the user-interaction analyzer is further configured to monitor when a user chooses from the group consisting of pausing, playing, skipping, repeating, and combinations thereof.

3. The system of claim 1, wherein the user-interaction analyzer is further configured to tag a media segment when user behavior with respect to viewing a ten second segment of the media deviates from normal.

4. The system of claim 1, wherein the user-interaction analyzer is further configured to tag a media segment when user behavior with respect to viewing a segment of the media is greater than one standard deviation.

5. The system of claim 1, wherein the interface is further configured to communicate with a user device displaying a viewer intensity chart regarding the segments tagged as not normal.

6. A computer-implemented method comprising:

receiving a media file containing media;

partitioning the media into segments;

monitoring user behavior with respect to the media and the segments;

logging user behavior with respect to the segments in memory, the user behavior comprising viewing behavior with respect to the media and the segments;

determining normal user behavior with respect to the media;

storing such normal user behavior in memory;

comparing logged user behavior with respect to interaction with a segment of the media with the determined normal user behavior with respect to the media;

determining whether logged user behavior of a particular media segment of the media file deviates from normal relative to the determined normal user behavior;

responsive to an not normal determination of a particular media segment, tagging a media segment in memory; and communicating with a user device configured to display indicia indicating the segments tagged as not normal.

7. The computer-implemented method of claim 6 further comprising: monitoring when a user chooses from the group consisting of pausing, playing, skipping, repeating, and combinations thereof.

8. The computer-implemented method of claim 6 further comprising:

responsive to a not normal determination of a particular approximate ten second media segment, tagging a media segment in memory.

9. The computer-implemented method of claim 6 further comprising:

responsive to a not normal determination of a particular media segment is greater than one standard deviation, tagging a media segment in memory.

10. The computer-implemented method of claim 6 further comprising:

communicating with a user device configured to display a heat map indicating the segments tagged as not normal.

11. The computer-implemented method of claim 6 further comprising:

communicating with a user device configured to display a viewer intensity chart regarding the segments tagged as not normal.

12. The computer-implemented method of claim 6 further comprising:

selecting the media from the group consisting of video, music, podcasts, audio books, multimedia presentations, and combinations thereof.

13. The computer-implemented method of claim 6 further comprising:

communicating with a user device selected from the group consisting of digital assistants, personal digital assistants, cellular phones, mobile phones, smart phones, laptop computers, and combinations thereof.

14. A non-transitory computer-readable media including processor-executable instructions that, when executed, cause one or more processors to perform operations comprising:

receiving a media file containing media;

partitioning the media into segments;

monitoring user behavior with respect to the media and the segments, the user behavior comprising viewing behavior with respect to the media and the segments;

logging user behavior with respect to the segments in memory;

determining normal user behavior with respect to the media;

storing such normal user behavior in memory;

comparing logged user behavior with respect to interaction with a segment of the media with the determined normal user behavior with respect to the media;

determining whether logged user behavior of a particular media segment of the media file deviates from normal relative to the determined normal user behavior;

responsive to an not normal determination of a particular media segment, tagging a media segment in memory; and communicating with a user device configured to display indicia indicating the segments tagged as not normal.

15. The non-transitory computer-readable media storing processor-executable instructions of claim 14, the operations further comprising:

monitoring when a user chooses from the group consisting of pausing, playing, skipping, repeating, and combinations thereof.

16. The non-transitory computer-readable media storing processor-executable instructions of claim 14, the operations further comprising:

responsive to a not normal determination of a particular approximate ten second media segment, tagging a media segment in memory.

17. The non-transitory computer-readable media storing processor-executable instructions of claim 14, the operations further comprising:

responsive to a not normal determination of a particular media segment is greater than one standard deviation, tagging a media segment in memory.

18. The non-transitory computer-readable media storing processor-executable instructions of claim 14, the operations further comprising:

communicating with a user device configured to display a viewer intensity chart regarding the segments tagged as not normal.

* * * * *